(12) United States Patent
  Whitfield

(10) Patent No.:  US 12,560,229 B2
(45) Date of Patent:      Feb. 24, 2026

(54) HARMONIC DRIVE

(71) Applicant: Goodrich Actuation Systems Limited, Solihull (GB)

(72) Inventor: Neil Stuart Russell Whitfield, Shifnal (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 18/205,091

(22) Filed: Jun. 2, 2023

(65) Prior Publication Data

US 2023/0407955 A1     Dec. 21, 2023

(30) Foreign Application Priority Data

Jun. 15, 2022    (EP) ..................................... 22275079

(51) Int. Cl.
  *F16H 49/00*        (2006.01)
  *B64C 13/02*        (2006.01)
       (Continued)

(52) U.S. Cl.
  CPC ........... *F16H 49/001* (2013.01); *B64C 13/02* (2013.01); *F16H 19/08* (2013.01);
       (Continued)

(58) Field of Classification Search
  CPC ......... F16H 2049/003; F16H 2019/085; F16H 19/08; F16H 49/001; B64C 13/02
       (Continued)

(56) References Cited

U.S. PATENT DOCUMENTS 3,789,700  A     2/1974  Cotreau et al.
7,297,087  B2    11/2007  Degen et al.
       (Continued)

FOREIGN PATENT DOCUMENTS

CN      110030359  A     7/2019
CN      212155697  U  *  4/2020    ............. F16H 49/00
       (Continued)

OTHER PUBLICATIONS

Abstract for CN110030359 (A), Published: Jul. 19, 2019, 1 page.
       (Continued)

*Primary Examiner* — T. Scott Fix
(74) *Attorney, Agent, or Firm* — CANTOR COLBURN LLP

(57)          ABSTRACT

A drive for a harmonic gear assembly, comprising an input shaft having a shaft axis (A) and an epicyclic carrier unit removably mounted around, and coaxial with the input shaft, the epicyclic carrier unit comprising a carrier having an interior circumference designed to match the outer circumference of the shaft and further comprising a first roller assembly mounted at a first location around the circumference of the carrier unit and comprising a first roller shaft extending substantially parallel to the shaft axis and a first roller rotatably mounted around the first rotor shaft, and a second roller assembly mounted at a second location around the circumference of the carrier unit and comprising a second roller shaft extending substantially parallel to the shaft axis and a second roller rotatably mounted around the second rotor shaft, the first and second rollers extending radially outwards from the carrier to define a major axis between the radially outer surfaces of the first and second rollers, and wherein the outer surface of the carrier unit at locations other than the first and second locations defines a minor axis.

3 Claims, 2 Drawing Sheets

(51) Int. Cl.
  *F16H 19/08*        (2006.01)
  *F16H 57/08*        (2006.01)

(52) U.S. Cl.
  CPC .. *F16H 2019/085* (2013.01); *F16H 2049/003*
            (2013.01); *F16H 2057/085* (2013.01)

(58) Field of Classification Search
  USPC ........................................................... 74/89
  See application file for complete search history.

(56)                   References Cited

U.S. PATENT DOCUMENTS

| | | | |
|---|---|---|---|
| 11,680,629 B2 * | 6/2023 | Hofmann .............. | F16H 49/001 |
| | | | 74/412 R |
| 2017/0276225 A1 * | 9/2017 | Takehana ............... | B25J 9/1025 |
| 2017/0321790 A1 * | 11/2017 | Klassen ............... | F16H 49/001 |
| 2021/0364046 A1 * | 11/2021 | Kernbaum ............... | F16D 3/04 |

FOREIGN PATENT DOCUMENTS

| | | | | | |
|---|---|---|---|---|---|
| DE | 102020204915 A1 | * | 10/2021 | .......... | B64C 13/341 |
| JP | 2019196826 A | * | 11/2019 | .......... | F16H 49/001 |
| JP | 2020203363 A | * | 12/2020 | | |
| KR | 20070070654 A | | 7/2007 | | |

OTHER PUBLICATIONS

Abstract of DE102020204915 (A1), Published: Oct. 21, 2021, 1 page.
Abstract of KR20070070654 (A), Published: Jul. 4, 2007, 1 page.
European Search Report for Application No. 22275079.6, mailed Nov. 29, 2022, 9 pages.

\* cited by examiner

HARMONIC DRIVE

CROSS REFERENCE TO RELATED APPLICATION

This application claims priority to European Patent Application No. 22275079.6 filed Jun. 15, 2022, the entire contents of which is incorporated herein by reference.

TECHNICAL FIELD

The present disclosure relates to strain wave gearing systems, otherwise known as harmonic drives e.g. for use in controlling flight control actuators.

BACKGROUND

Strain wave gearing, also known as a harmonic drive, is used in many drive trains as it is compact and lightweight and can be used to provide a high gear ratio between an input or drive shaft and an output shaft. These properties make strain wave gearing suited to use in aircraft and other vehicles where space is limited and weight of components should be minimised, whilst maintaining reliability and performance.

A strain wave gear system includes a wave generator which is in the form of an elliptical shaft and a compliant ball bearing in which the elliptical shaft rotates. A flexible toothed ring (a flex spline) is mounted about the wave generator and engages, and conforms to the shape of, the output shaft. A fixed outer ring is provided around the flex spline and has inner teeth that engage with the outer teeth of the flex spline but, due to the elliptical shape of the wave generator, this only forces the flex spline to engage with the teeth of the outer ring at certain degrees of rotation.

In operation, the drive shaft is rotated e.g. by a motor. The bearing conforms to the elliptical shape of the drive shaft. The force from the drive shaft is applied to the flex spline via rollers or ball bearings to press the flex spline against the circular outer ring to engage with the inner teeth of the outer ring at the major axes of the ellipse. Rotation of the drive shaft thus causes a slower rotation of the flex spline, in the opposite direction and, therefore, a slower rotation of the output shaft to which the flex spline is connected.

The flex spline is currently drive by an arrangement made up of several components including the wave generator, a bearing with a bearing race and bearing cage, and multiple rollers or balls. Typically, there may be around sixty or more rollers, assembled into two rows, for each flex spline. The rollers need to be held in place with grease or other means when the actuator is assembled. In some applications, e.g. in multi-slice harmonic drive actuators, this number of rollers is required for each slice. Assembling and retaining a large number of rollers as well as the other components mentioned above is time and cost intensive. Further, the assembly, in requiring many small parts, has many points of failure. The resulting assembly is also relatively large and heavy.

There is, therefore, a need for an assembly for driving the flex spline of a harmonic drive that retains all of the advantages of existing strain wave/harmonic drive gearing but also has improved means for transferring the elliptical motion of the drive shaft to the flex spline.

SUMMARY

According to the disclosure, there is provided a drive for a harmonic gear assembly, comprising an input shaft having a shaft axis and an epicyclic carrier unit removably mounted around, and coaxial with the input shaft, the epicyclic carrier unit comprising a carrier having an interior circumference designed to match the outer circumference of the shaft and further comprising a first roller assembly mounted at a first location around the circumference of the carrier unit and comprising a first roller shaft extending substantially parallel to the shaft axis and a first roller rotatably mounted around the first rotor shaft, and a second roller assembly mounted at a second location around the circumference of the carrier unit and comprising a second roller shaft extending substantially parallel to the shaft axis and a second roller rotatably mounted around the second rotor shaft, the first and second rollers extending radially outwards from the carrier to define a major axis between the radially outer surfaces of the first and second rollers, and wherein the outer surface of the carrier unit at locations other than the first and second locations defines a minor axis.

Also provided is a harmonic gear assembly and an actuator.

Optional features are defined in the dependent claims.

BRIEF DESCRIPTION

Examples according to the disclosure will now be described with reference to the drawings. It should be noted that these are examples only and variations are possible within the scope of the claims.

DETAILED DESCRIPTION

Figure 1:
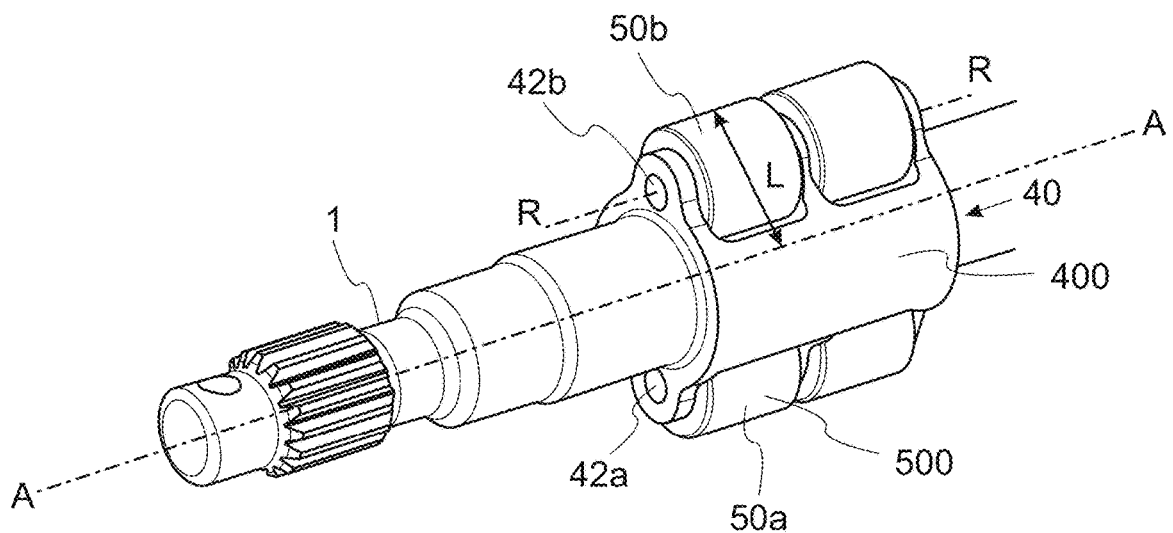
FIG. 1 shows a harmonic driver system according to the disclosure.

The present invention is concerned with providing an improved driver part of a harmonic drive assembly, that avoids the need for many rollers or balls and roller cages and the separate wave generator and the difficulty in assembling the multiple bearing components between the wave generator and the flex spline.

The driver comprises an input shaft 1 arranged to be rotated by the motor drive (not shown) as is known from conventional harmonic gears. The input shaft 1 is shown with splines 2 for engagement with a motor drive shaft (not shown) such that the shaft 1 is caused to rotate about its axis A by the motor. The operation of a harmonic gear is that rotation of the input shaft 1 rotates a wave generator that results in the flex spline 20 taking on a non-circular, and usually an oval or elliptical shape which rotates about the shaft axis A within a circular outer ring 30. The flex spline 20 has outer teeth or other contact or engaging means that engage with or contact teeth or other engaging means on the inner circumference of the outer ring 30 at points corresponding to the largest radial dimensions of the non-circular shape e.g. the major axis of the elliptical shape which, as described above, causes the flex spline to rotate backwards relative to the rotation of the input shaft at a stepped down gear ratio, causing resulting stepped down rotation of the outer ring to which the flex spline is connected. In addition to elliptical forms, wave generators may also take a lobed form having e.g. three lobes or points of larger radial dimension than the points therebetween.

In the present invention, the elliptical wave generator is formed by a roller carrier 40 which is mounted around, and coaxial with the input shaft 1, and has, at two radially opposite locations, roller shaft 42a, 42b on which a roller 50a, 50b is rotatably mounted, such that the opposing rollers 50a, 50b are mounted to rotate relative to the carrier 40 about a roller axis R substantially parallel to the input shaft axis A. Bearings (e.g. needle bearings 45) are provided between the rollers and the roller shafts to allow rotation of the rollers. The rollers extend beyond the outer circumference of the carrier 40 such that the outer surface 500 of each of the opposing rollers 50a, 50b is at a distance L from the input shaft axis A and the outer surface 400 of the carrier which is between the rollers is at a distance 1 from the input shaft axis, where 1 is less than L, so that the combination of the carrier and the rollers, mounted on the input shaft, has an elliptical envelope defined by the outer surfaces 500 of the rollers and the outer surface 400 of the carrier. In the example shown two sets of two rollers are provided i.e. two rollers 50a, 50b are mounted on each roller shaft 42a, 42b. In other examples, this may be just a single roller on each shaft. Alternatively, more than two rollers may be provided on each shaft.

The bearings and rollers are mounted to the carrier to form an epicyclic carrier unit that can then be mounted as a single, pre-assembled unit, to the input shaft 1. The input shaft itself can, therefore, have a standard circular cross-section and does not, as in conventional assemblies, need to be machined as an elliptical shaft. The elliptical shape is provided by the combination of the carrier and the rollers that are mounted to the input shaft. If the carrier or parts thereof need to be replaced, the carrier unit can be easily dismounted from the input shaft and repaired/replaced for re-assembly to the shaft.

The carrier can be made from a single machine piece or can be made of multiple parts joined together using conventional means such as splines, lugs, welding etc.

Figure 2:
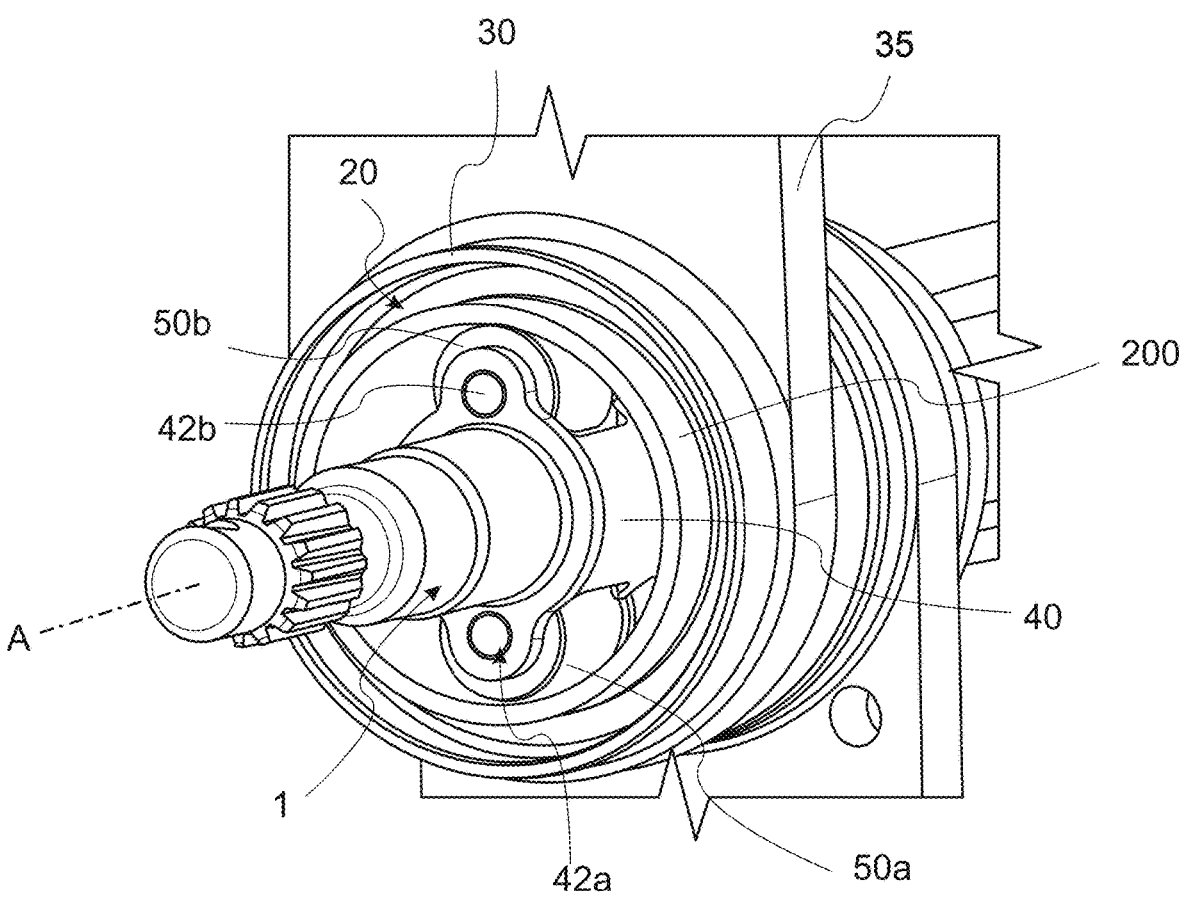
FIG. 2 shows a system as in FIG. 1, in a harmonic gear assembly.
Figure 3:
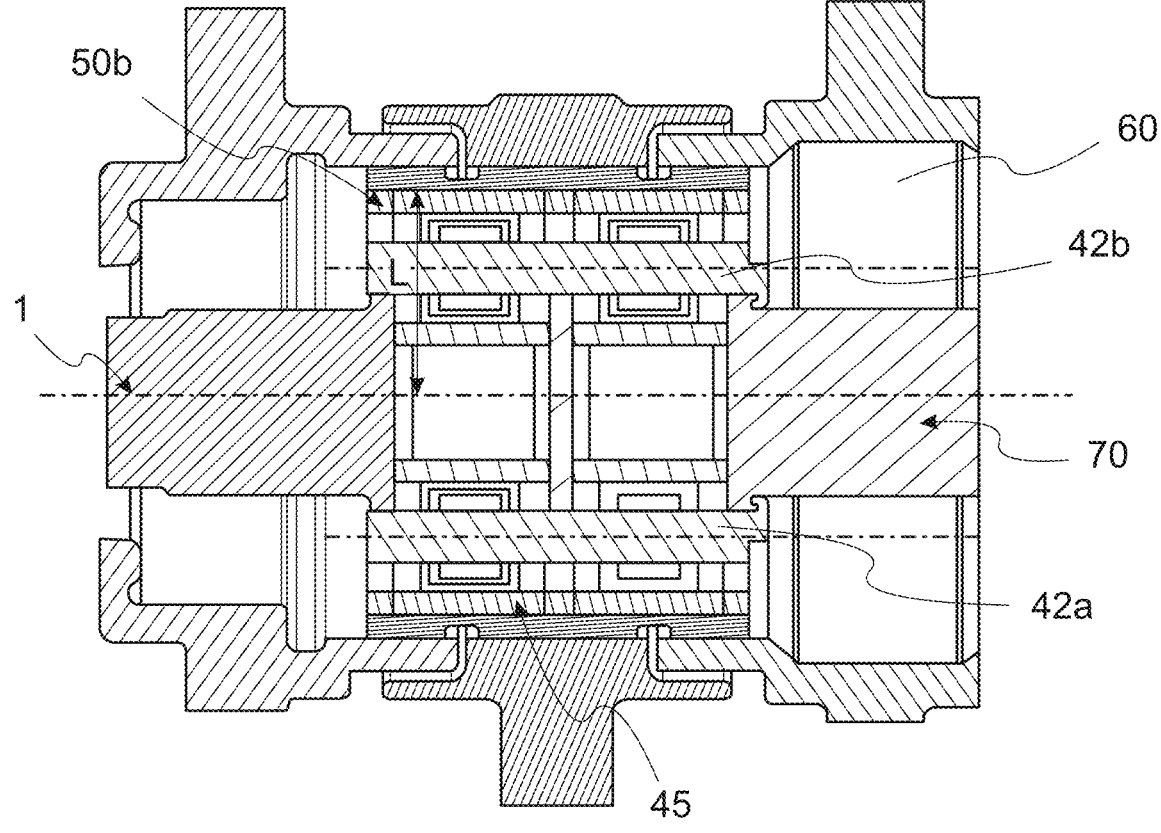
FIG. 3 is a sectional view of the assembly of FIG. 2.

The combined input shaft and epicyclic carrier unit can be easily assembled to the rest of the harmonic gear as shown in FIGS. 2 and 3 wherein the flex spline 20 fits around the carrier in contact with the rollers 50a, 50b which define the major axis of the ellipse of the flex spline 20 which is mounted within the circular outer ring 30. The outer ring 30 is fixed e.g. by bracket 35 to a housing (not shown). The flex spline 20 is fixed to an output shaft 60.

As the input shaft 1 rotates, the epicyclic carrier unit and the rollers 50a, mounted thereto rotates about the input shaft axis A. The flex spline 20 is tightly fitted around the rollers, and as the input shaft and the carrier rotate about axis A, the position of the rollers rotates relative to the flex spline 20. The rollers also rotate about the roller shafts to allow rotation of the carrier relative to the flex spline. Because the flex spline 20 is made of a thin, flexible material, it conforms to the shape of the envelope of the epicyclic carrier unit i.e. is forced outwards to correspond to the major axis of the ellipse at the points where the rollers contact the flex spline and deform it radially outwards relative to the input shaft such that at the locations of the rollers, the outer surface 200 of the flex spline 20 is at the greatest distance from the input shaft axis and contacts the outer ring 30. The rest of the flex spline, not in contact with the rollers, is not pushed as far from the input shaft, and, in fact, due to the elastic nature of the flex spline, will actually deform radially inwards, and so does not contact the outer ring. When the flex spline engages the outer ring (e.g. by engaging teeth (not shown)) the fact that the outer ring is stationary causes the flex spline to rotate a small amount relative to the input shaft, which it is able to do by causing rotation of the rollers about the roller shaft axis R, in a direction of rotation opposite to that of the input shaft. This results in a corresponding rotation of the output shaft connected to the flex spline.

Because the elliptical shape of the flex spline is caused by the large rollers rotating around the inside of the flex spline and deforming it at the points of contact, the contact stress between the wave generator and the flex spline is reduced compared to conventional harmonic gearing in which the elliptical wave generator is always in contact with the flex spline via multiple roller bearings.

If the assembly is to be used in a multi-splice actuator, several flex splines will be required to cause movement of respective slices. The present invention is suited to such multi-splice assemblies in that multiple epicyclic carrier units, as described above, can be mounted to the input shaft and to different outputs. A shaft 70 may be provided to transfer drive from the input shaft to the next slice or to connect the assembly to the output shaft.

By combining the wave generator and bearings in a single epicyclic carrier unit, the driver can be easily assembled without the need for many separate parts including small bearing parts. As the rollers and their bearings are pre-mounted to the carrier unit and combine with that unit to form the elliptical shape of the wave generator, maintenance and repair of the assembly is considerably simplified.

It is expected that the mechanism would be particularly useful in areas where light, compact gearing with high gear ratio are desired, such as (but not only) in controlling aircraft flight control surfaces.

The invention claimed is:

1. A harmonic gear assembly, comprising:

an input shaft having an input shaft axis, coupled to the motor; and a removable epicyclic carrier unit, removably mounted around, and coaxial with the input shaft, the epicyclic carrier unit comprising, in a single unit for removable mounting around the input shaft, and configured for being rotationally fixed to the input shaft when mounted to the input shaft, the removable epicyclic carrier unit including:

a carrier having an interior circumference designed to match an outer circumference of the shaft;

a plurality of roller assemblies mounted to the carrier, each including one of a plurality of rollers, including:

a first roller assembly mounted at a first axial location along the input shaft and at a first circumferential location around the circumference of the carrier unit and comprising a first roller shaft extending substantially parallel to the input shaft axis and a first roller rotatably mounted around the first roller shaft; and a second roller assembly mounted at the first axial location along the input shaft and at a second circumferential location around the circumference of the carrier unit and comprising a second roller shaft extending substantially parallel to the input shaft axis and a second roller rotatably mounted around the second roller shaft;

a third roller assembly mounted at a second axial location along the input shaft that is adjacent to the first axial location, and at the first circumferential location around the circumference of the carrier unit, so that a third roller is circumferentially aligned with the first roller and rotates about the first roller shaft; and a fourth roller assembly mounted at the second axial location along the input shaft and at the second circumferential location around the circumference of the carrier unit, so that the fourth roller is circumferentially aligned with the second roller and rotates about the second roller shaft;

wherein the plurality of rollers extend radially outwards from the carrier such that a radially outer surface of each of the plurality of rollers is at a distance L from the input shaft axis A and a radially outer surface of the carrier at locations between the plurality of rollers is at a distance i from the input shaft axis, wherein i is less than L;

wherein a combination of the carrier and the plurality of rollers, mounted on the input shaft, define an elliptical envelope with a major axis defined by the outer surfaces of the first and second rollers and a minor axis defined by the outer surface of the carrier; and wherein a wave generator is defined by the input shaft and the removable epicyclic carrier unit;

a flex spline mounted around and compliant with the removable epicyclic carrier unit, wherein the flex spline rotates in an opposite direction of the wave generator;

an outer ring mounted to the flex spline;

a bracket fixed to the outer ring; and an output shaft fixed to the flex spline; and needle bearings between the rollers and the respective roller shafts.

2. The drive of claim 1, wherein the first location is radially opposite the second location, such that the epicyclic carrier unit defines an elliptical envelope.

3. The drive of claim 1, wherein the flex spline is brought into contact with the outer ring at locations defined by the positions of the roller assemblies and not at positions between the roller assemblies.

\* \* \* \* \*